United States Patent [19]
Smith

[11] Patent Number: 5,354,459
[45] Date of Patent: Oct. 11, 1994

[54] APPARATUS AND METHOD FOR REMOVING ODOROUS SULFUR COMPOUNDS FROM POTABLE WATER

[76] Inventor: Jerry Smith, 11673 Tank Farm Rd., Cygnet, Ohio 43413

[21] Appl. No.: 33,861

[22] Filed: Mar. 19, 1993

[51] Int. Cl.⁵ .............................................. C02F 1/20
[52] U.S. Cl. .................... 210/188; 210/202; 210/266; 210/721; 210/170
[58] Field of Search ............... 210/202, 265, 747, 718, 210/722, 721, 257.1, 266, 750, 188, 218, 170; 261/78.2, 116, DIG. 75; 95/260, 266, 247; 96/203, 204

[56] References Cited
U.S. PATENT DOCUMENTS

| | | | |
|---|---|---|---|
| 858,183 | 6/1907 | Holle | 210/758 |
| 888,090 | 5/1968 | Kestner | 210/758 |
| 1,827,583 | 10/1931 | James | 261/78.2 |
| 1,964,487 | 6/1934 | Smith | 210/750 |
| 2,060,557 | 11/1936 | Davis | 261/DIG. 75 |
| 2,237,882 | 4/1941 | Lawlor et al. | 210/722 |
| 2,379,753 | 7/1945 | Sebald | 210/718 |
| 3,649,532 | 3/1972 | McLean | 210/722 |
| 4,116,387 | 9/1978 | Kremer, Jr. et al. | 261/78.2 |
| 4,157,304 | 6/1979 | Molvar | 261/DIG. 75 |
| 4,162,970 | 7/1979 | Zlokarnik | 261/DIG. 75 |
| 4,162,971 | 7/1979 | Zlokarnik | 261/DIG. 75 |
| 4,430,228 | 2/1984 | Paterson | 210/722 |
| 4,522,151 | 6/1985 | Arbisi et al. | 261/DIG. 75 |
| 4,526,692 | 7/1985 | Yohe et al. | 210/747 |
| 4,534,867 | 8/1985 | Kreusch et al. | 210/722 |
| 4,563,782 | 1/1986 | Dijkhuizen | 261/DIG. 75 |
| 4,608,163 | 8/1986 | Yohe et al. | 210/150 |
| 4,659,463 | 4/1987 | Chandler et al. | 210/202 |
| 4,828,768 | 5/1989 | Talmar | 261/DIG. 75 |
| 4,840,753 | 6/1989 | Jungmann et al. | 261/DIG. 75 |
| 4,857,184 | 8/1989 | DeLoach | 210/170 |
| 4,861,352 | 8/1989 | Cheng | 261/DIG. 75 |
| 4,867,918 | 9/1989 | Kiyonaga et al. | 261/DIG. 75 |
| 4,885,084 | 12/1989 | Doyle | 210/221.2 |
| 4,966,692 | 10/1990 | Overy | 210/279 |
| 4,992,181 | 2/1991 | Siebert | 210/747 |
| 5,054,423 | 10/1991 | Escobal | 261/DIG. 75 |
| 5,061,458 | 10/1991 | Miller | 210/170 |
| 5,069,796 | 12/1991 | Fox | 210/747 |
| 5,096,580 | 3/1992 | Auchincloss | 210/722 |
| 5,096,596 | 3/1992 | Hellenbrand et al. | 210/259 |
| 5,147,530 | 9/1992 | Chandler et al. | 210/170 |
| 5,173,092 | 12/1992 | Rudder | 210/170 |

Primary Examiner—Cynthia L. Nessler
Attorney, Agent, or Firm—David C. Purdue; John C. Purdue

[57] ABSTRACT

Apparatus for treating potable water to remove odorous sulfur compounds therefrom is disclosed. The apparatus comprises a treating tank, a fogging nozzle, means for directing water to be treated through the fogging nozzle and into the treating tank, means for injecting compressed air into the water directed through the fogging nozzle, a filter vessel, and a de-aerating vessel. The compressed air injected into the water that is directed through the fogging nozzle is at a pressure sufficiently high that minus 100 micron water droplets leave the fogging nozzle. Air, most of the sulfur compounds present in the water and some entrained water are ultimately discharged from the treating tank. The means for directing the water to be treated through the fogging nozzle is controlled to maintain a predetermined water level in the treating tank. The filter vessel contains a bed of a filter medium which forms a loose bond with the remaining $H_2S$ in the filter vessel. The apparatus also includes means for directing water from the treating tank through the filter bed and into the de-aerating vessel, means for injecting air into water withdrawn from the treating tank before it flows through the filter bed, and means for venting gases from the de-aerating tank.

2 Claims, 5 Drawing Sheets

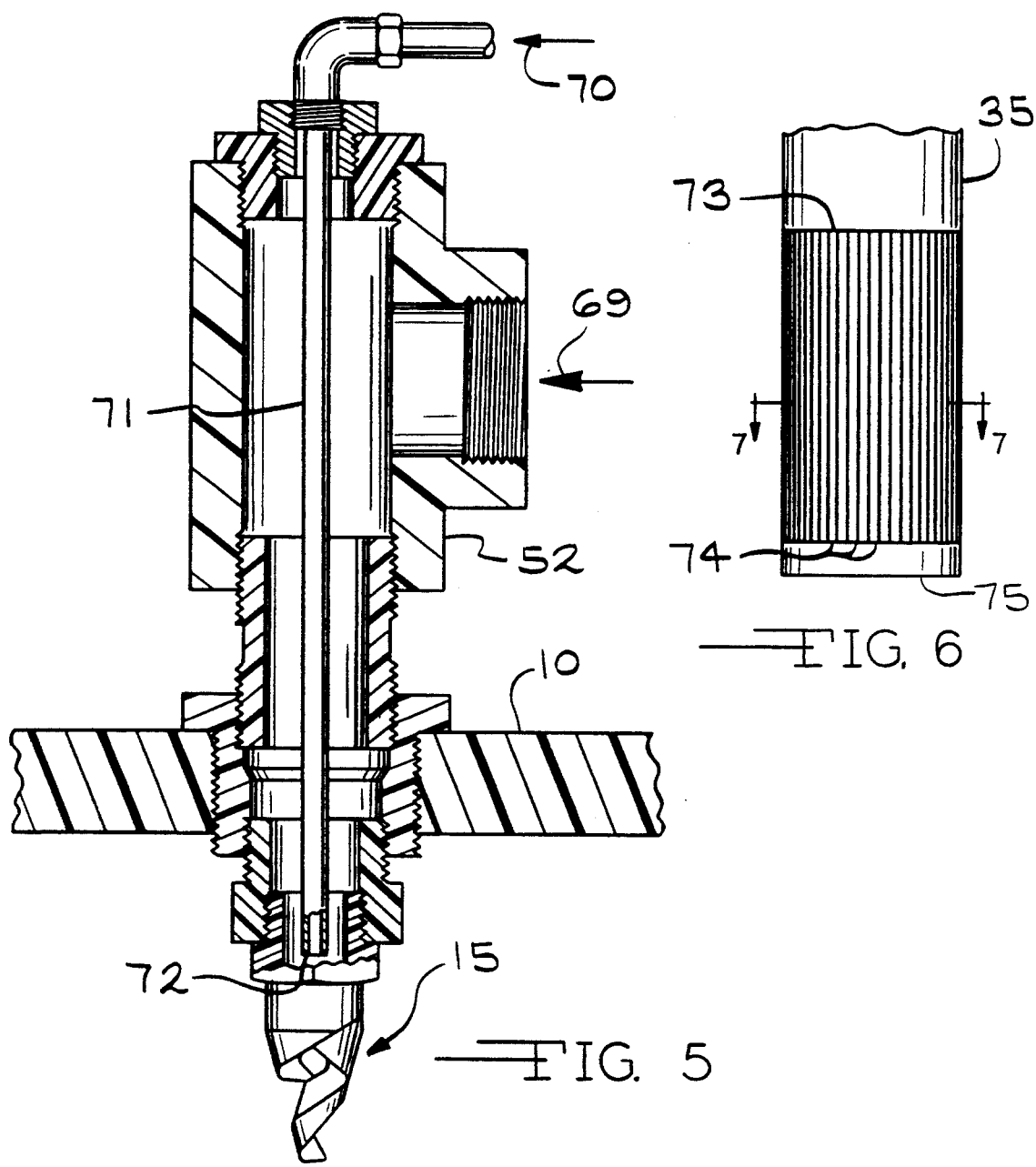
FIG. 6
FIG. 5
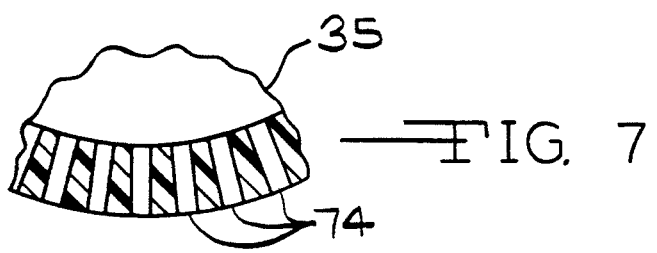
FIG. 7

APPARATUS AND METHOD FOR REMOVING ODOROUS SULFUR COMPOUNDS FROM POTABLE WATER

BACKGROUND OF THE INVENTION

1. Field of the Invention

This invention relates to the removal of odorous sulfur compounds from potable water. Briefly, water from a well and compressed air are sprayed from a fog nozzle into a treating tank to maintain a predetermined water level in the tank, while, whenever the pressure at the top of a pressurized de-aerating tank falls below a predetermined level, water is pumped from the bottom of the treating tank into a pressurized filter vessel which is open to the de-aerating tank. Compressed air is introduced into the filter vessel whenever water is pumped thereinto. Air, water and sulfur compounds are vented from a level in the treating tank higher than the predetermined water level; air is also discharged from the top of the de-aerating tank, flowing through a self sensing air valve. Water flows from the de-aerating tank in response to demands from a distribution system. It is advantageous for the upper part of the treating tank to be packed with spheres over which the fogged water and air in that portion of the tank flow before collecting in the lower portion of the tank. Water which is pumped to the filter vessel enters through a control module, flows downwardly through a filter medium and into and upwardly through a central tube and the discharge side of the control module, and to the de-aerating tank.

2. The Prior Art

The instant invention is deemed to constitute an improvement over U.S. Pat. No. 4,992,181, *WATER TREATMENT METHOD*, Feb. 12, 1991, which discloses the desulfurization of water in apparatus comprising a vessel 10 in which the water is sprayed upwardly through air, a standpipe 11 in which water is sprayed through air from a nozzle 26 "to maintain a given pressure, say 40 psig (about ¼ MPa), in the standpipe 11", a vessel 13 which contains a fluidized bed of activated carbon and a green sand or zeolite filter 17. Some sulfur is removed by aeration in the vessel 11, while the rest is removed by the bed of activated carbon. The patent also discloses (see the paragraph which commences in line 32 of column 4) that column packing material can be used to promote or accelerate the aeration of feed water in a vessel 41 (FIG. 2), naming "Jaeger Tri-Packs ® column packing balls" as suitable. The patent includes the following sentence (column 4, lines 61 and following):

> "It is further contemplated that the use of column packing material, including a catalyst, in the vessel 41, the standpipe 11, or both, may obviate the use of the vessel 13 and contents, the vessel 16 and contents, or both."

The patent does not indicate that it was ever demonstrated that "the use of column packing material, including a catalyst," did obviate the use of either or both of the vessels 13 and 16 and their contents.

The following patents (all U.S.) have also been considered, but are not deemed to disclose or suggest the instant improvements:

U.S. Pat. No. 323,432, Aug. 4, 1885: this patent relates to the purification of water by forcing air into a stream of water that is flowing in a pipe.

U.S. Pat. No. 835,886, Nov. 13, 1906: while the patent relates to the aeration of water, it is distilled water that is aerated; the use of a fogging nozzle is not suggested; and the aeration pressure is not disclosed.

U.S. Pat. No. 938,075, Oct. 26, 1909: this patent discloses apparatus for "high pressure" treatment of water to remove iron and similar impurities. The water is discharged from a pipe 9 into an open pan 10, overflowing into pans 11 and 12, and falling through "high pressure" air. It does not appear that an actual pressure is named.

U.S. Pat. No. 1,985,435, Dec. 25, 1934: a mixture of air and water from a pump 7 is discharged into an aerator which operates at ambient pressure. The water flows by gravity from a first to a second to a third spray pan 21, and is then filtered and pumped to a storage tank.

U.S. Pat. No. 2,200,580, May 14, 1940: sewage and industrial wastes are caused to flow downwardly through a bacterially active contact mass in the presence of "an oxygen-containing gas such a air".

U.S. Pat. No. 2,591,134, Apr. 1, 1952: water is sprayed upwardly through air at atmospheric pressure against a baffle and then falls into water in a tank 4.

U.S. Pat. No. 3,387,431, Jun. 11, 1968, discloses the desulfurization of water in a vessel 2. Small droplets of the water are sprayed from a nozzle 3 into the interior of a tube 4 which extends through a bed 5 of iron oxide or of another material that reacts with hydrogen sulfide. The water droplets entrain air from above the bed 5, which flows downwardly with the water through the tube 4. The pressure of the water sprayed is 10 psi. higher than that of the air in the vessel 2. Desulfurized water is collected in a reservoir 6, from which is flows through an outlet pipe 7 for use. A gaseous mixture of air and $H_2S$ removed from the water flows upwardly through the bed of iron oxide or other material which reacts with the $H_2S$ to remove the sulfur, so that only the air reaches the top of the bed.

U.S. Pat. No. 3,543,937, Dec. 1, 1970: discloses the use of thin walled spheres made of a synthetic resin as packing in a filter on which sewage and organic industrial wastes are sprayed.

U.S. Pat. No. 4,097,201, Jun. 27, 1978, discloses the desulfurization of underground water inside a well casing 12. Compressed air is discharged from "an air screen and outlet assembly 36", "to purge the well water of corrosive gases such as sulphur gas". Air and "sulphur gas" ($H_2S$) are vented from a vertical standpipe 42, while a downwell pump 50 discharges desulfurized water into a service line 58.

U.S. Pat. No. 4,544,488, Oct. 1, 1985: this patent discloses the removal of benzene, xylene, toluene, and halogenated aliphatic hydrocarbons from groundwater using an induced draft stripper which has a "spray tree" at one end and "eliminators" at the other, followed by carbon treatment; the patent does not disclose a fogging nozzle. Pressures up to about 45 psig are reported, but these appear to be the pressures of water serving the spray tree, which is necessarily higher than the pressure inside the stripper.

U.S. Pat. No. 4,582,610, Apr. 15, 1986: this patent discloses water aeration apparatus where a part of the water pumped from a well is sprayed inside a casing where it falls through air in the casing back into the well. Apparently, the air would be at atmospheric pressure. The patent says it is preferable for 30 to 50 percent of the water pumped to be returned to the well.

U.S. Pat. No. 4,892,664, Jan. 9, 1990: water contaminated with volatile organic chemicals is delivered by a spray head onto the top of packing (e.g., Jaeger Tri-Packs, polypropylene spheroids 2 inches in diameter) and flows downwardly through the packing, countercurrent to air. The air is blown into the bottom of the packed column, is treated to destroy the volatile organic chemicals released to it from the contaminated water, and is discharged through a vent to the atmosphere. Presumably, the air in the packed column is at essentially atmospheric pressure.

U.S. Pat. No. 5,045,215, Sep. 3, 1991: water contaminated with radon and volatile organic chemicals, xylene, toluene and halogenated hydrocarbons being named, is sprayed as a "fine mist" in an aerator that is pressurized to about 3 to 4 inches of water.

U.S. Pat. No. 5,069,796, Dec. 3, 1991: this patent discloses the removal of benzene, xylene and toluene from groundwater using a packed spray tower through which the ground water flows downwardly, countercurrent to air, and a carbon bed. The packed spray tower apparently operates at ambient pressure; a fogging nozzle is not disclosed.

BRIEF DESCRIPTION OF THE INSTANT INVENTION

The instant invention is based upon the discovery of apparatus for removing odorous sulfur compounds from potable water. The apparatus comprises a treating tank with a fogging nozzle, means for causing air and water from which odorous sulfur compounds are to be removed to be discharged from the fogging nozzle as required to maintain a predetermined water level in the treating tank, a filter vessel containing a "pyrolox", green sand or the like filter medium, a de-aerating tank with a valved outlet to a water distribution system, a self-sensing valve for venting gases from the de-aerating tank, means for causing water to flow from the treating vessel and from the filter vessel to the de-aerating tank to maintain a predetermined pressure in the de-aerating tank, and means for injecting air under pressure into the water flowing into the filter vessel. Air, most of the sulfur compounds present in the water and some entrained water are ultimately discharged from the treating tank, before the water is further treated in the apparatus.

BRIEF DESCRIPTION OF THE DRAWINGS

FIG. 5 is a vertical sectional view of a fogging nozzle through which water to be treated and compressed air enter the treating tank of the apparatus according to the invention.

FIG. 6 is a view in elevation of the lower end of a tube through which treated flows from the filter vessel of the apparatus according to the invention.

FIG. 7 is a horizontal sectional view along the line 7—7 of FIG. 6.

DESCRIPTION OF THE PREFERRED EMBODIMENT

Figure 1:
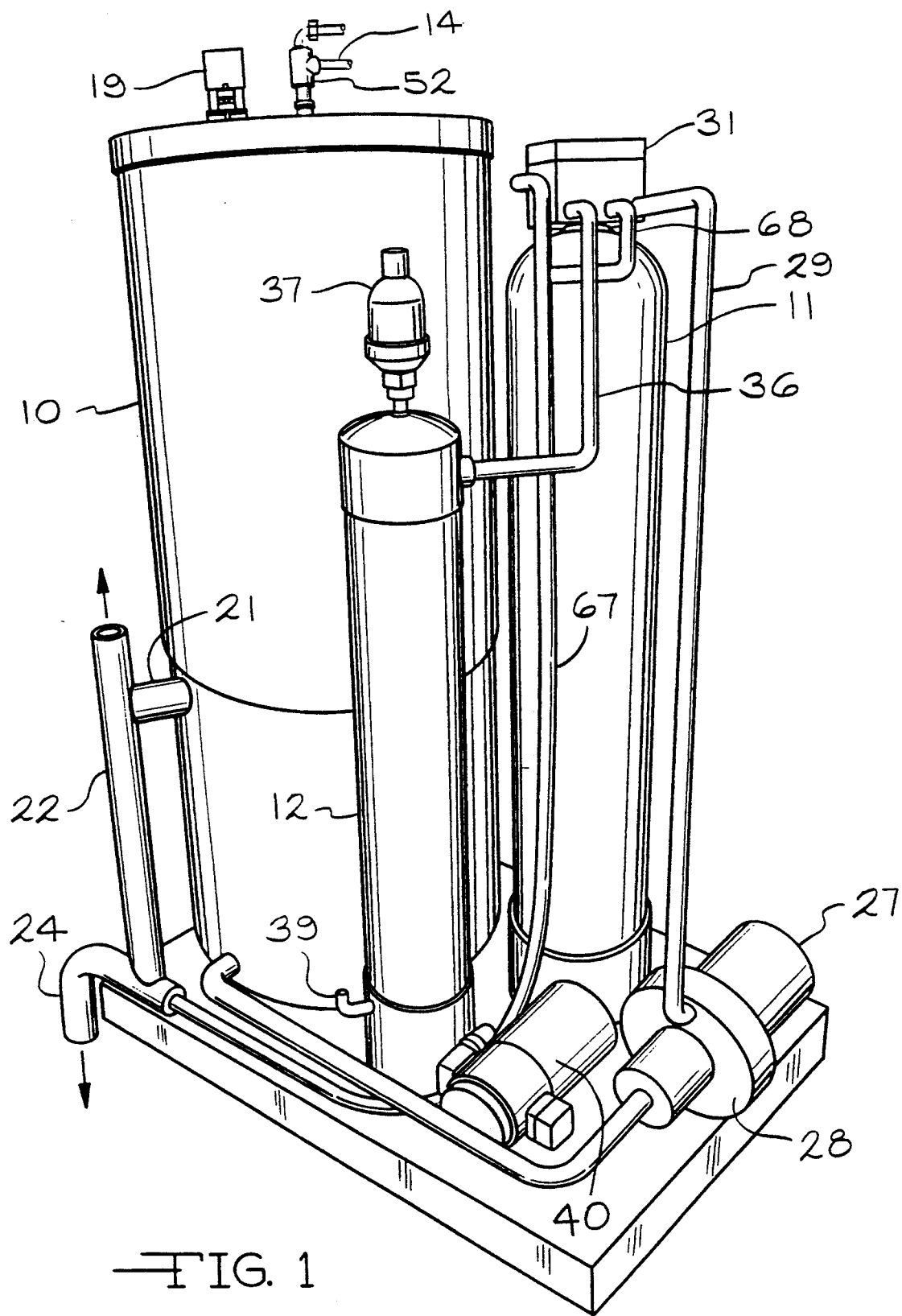
FIG. 1 of the attached drawings is a perspective view of the apparatus according to the invention which comprises a treating tank, a filter vessel and a de-aerating tank for removing odorous sulfur compounds from potable water.
Figure 2:
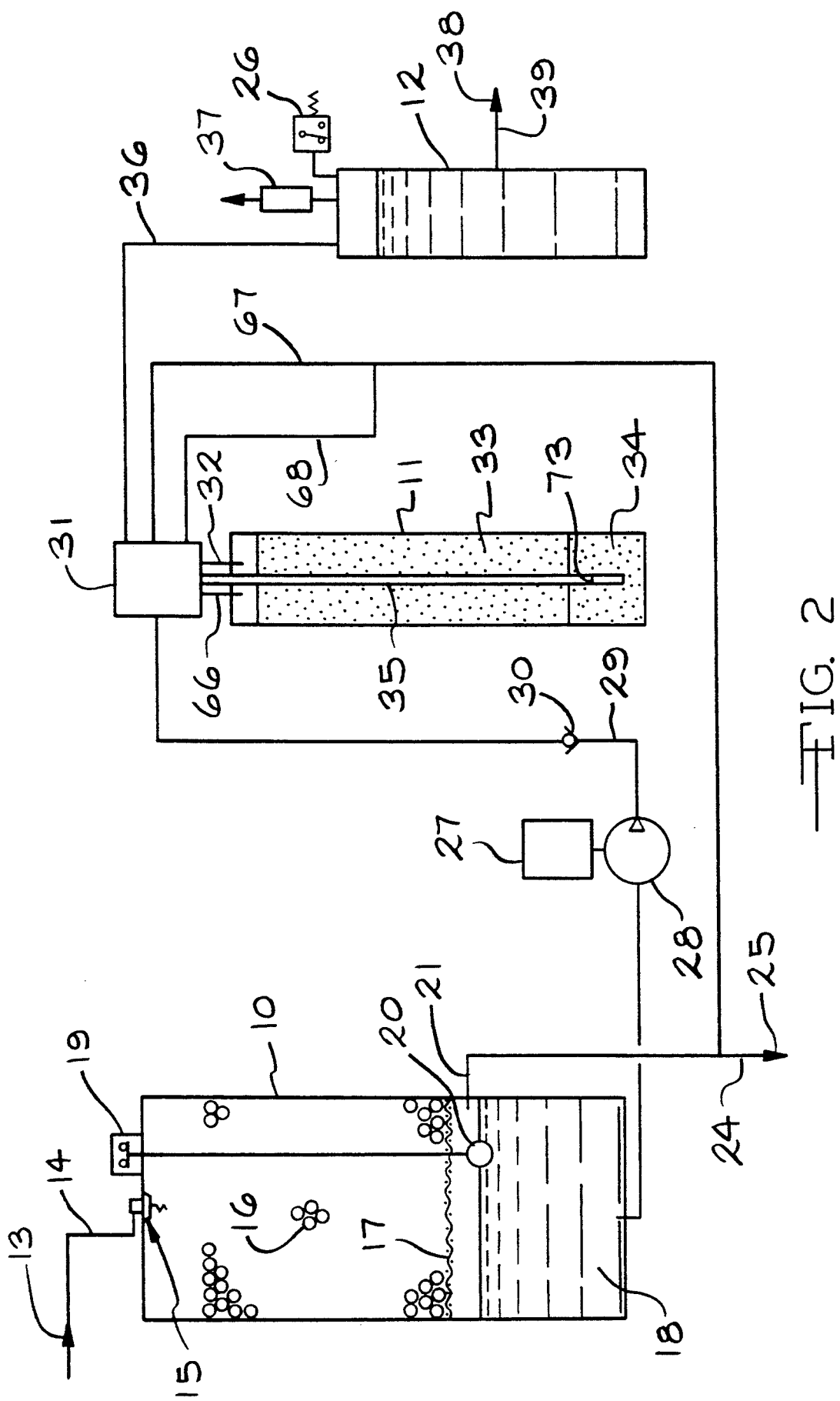
FIG. 2 is a schematic diagram showing the water circuits of the apparatus of FIG. 1.

Referring to FIG. 1, the apparatus of the instant invention comprises a treating tank 10, a filter vessel 11, and a de-aerating tank 12. As shown in FIG. 2, water from a well (not illustrated) enters the system as indicated by an arrow 13, flowing through a line 14 to a fogging nozzle indicated generally at 15 inside the treating tank 10. The water, as is subsequently described in more detail, is fogged in the nozzle 15 with air at a pressure of about 90 pounds per square inch gauge ("psig.") and discharged into the interior of the treating tank 10, where it flows over hollow polypropylene spheres 16 which rest on a screen 17, and into a body 18 of water in the bottom of the treating tank 10. A pump (not illustrated in FIG. 2) is energized and delivers water from the well whenever a switch 19 is closed because a float 20 is below a predetermined level, and is de-energized because the switch 19 is opened when the float 20 returns to that level. Air introduced into the treating tank 10 through the fogging nozzle 15 and odorous sulfur compounds released from the water are vented from the treating tank 10 through a line 21 to a vent stack 22 (FIG. 3), from which they are discharged as indicated by an arrow 23. Referring again to FIG. 2, any water carried out of the treating tank 10 by the air and sulfur compounds flows downwardly through a line 24 and, as indicated by an arrow 25, to a sewer or septic tank, neither of which is illustrated.

A pressure switch 26 energizes a motor 27 to drive a pump 28 as required to maintain a predetermined pressure in the de-aerating tank 12. Water from the body 18 in the treating tank 10 flows to the suction side of the pump 28, from which it is discharged into a line 29 for flow through a check valve 30, a control module 31 and through a line 32 into the filter vessel 11. As is subsequently explained in more detail, compressed air at a pressure of, say, 90 psig. is injected into the water flowing through the line 29 before the water enters the control module 31. The aerated water that enters the filter vessel 11 flows downwardly therein through a filter bed 33 and a base 34 of flint on which the medium of the filter rests, and then into a tube 35 and upwardly into the control module 31, exiting into a line 36 through which it flows to the de-aerating tank 12.

The filter bed 33 can be composed of a filter medium that is commercially available from Media under the trade designation "Pyrolox". It is a granular material which is minus 20 plus 60 mesh, U.S. Sieve Series, which has a specific gravity of 1.94 grams per cc. and which forms a loose bond with iron and manganese cations and with hydrogen sulfide, removing them from the water that flows downwardly through the filter vessel 11. Green sand has also been used as the filter medium, removing iron and manganese cations and hydrogen sulfide satisfactorily, but is enough more friable than the "Pyrolox" material that it requires more frequent replacement.

Air and volatile sulfur compounds are vented from the top of the de-aerating tank 12 through a self sensing valve 37. The flow through the valve 37 is at a slow rate, so that venting can occur while aerated water is flowing from the filter tank 11 into the de-aerating tank 12. As indicated by an arrow 38, a line 39 is operably connected to deliver water to a domestic distribution system, not illustrated. As previously stated, whenever the pressure in the de-aerating tank 12 is below a set point of, say, 40 psig., the switch 26 closes, energizing the motor 27, and causing water to flow from the treating tank 10 through the filter vessel 11 and to the de-aerating tank 12, as just described, to restore the pressure in the de-aerating tank 12 to 50 psig.

Figure 3:
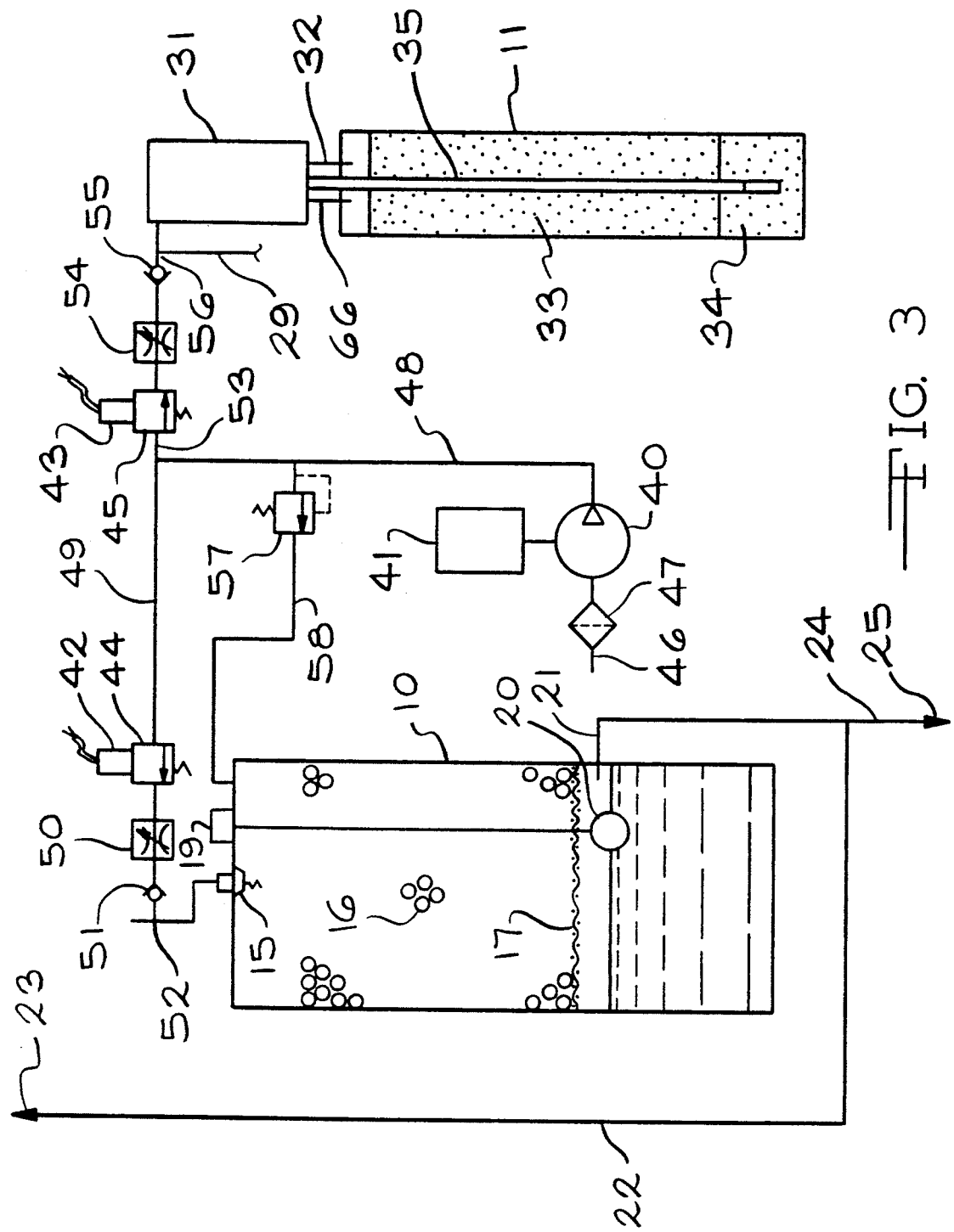
FIG. 3 is a schematic diagram of the pneumatic circuits of the apparatus of FIG. 1.

The apparatus also includes a pneumatic system shown in FIG. 3, and comprising an oil-less compressor 40 which is operably connected to be driven by a motor 41 and two solenoids, designated 42 and 43, respectively. Whenever the switch 19 is closed so that the well pump (not illustrated in FIG. 3) is operating, the motor 41 is energized, and drives the compressor 40; the solenoid 42 is energized so that an associated valve 44 is open, and the solenoid 43 is de-energized so that an associated valve 45 is closed. As a consequence, ambient air flows through a line 46 and a filter 47 into the suction side of the compressor 40, and compressed air at about 90 psig. flows through a line 48, a line 49, the valve 44, an orifice 50, and check valve 51 to a Tee 52, from which it is injected into the fogging nozzle 15 as subsequently described in more detail. Whenever the pressure switch 26 (FIG. 2) is closed so that the pump 28 is operating, the motor 41 (FIG. 3) is energized, and drives the compressor 40; the solenoid 43 is energized so that the valve 45 is open; also, if the well pump (not illustrated in FIG. 3) is energized, the solenoid 42 is energized, so that the valve 44 is open. As a consequence, compressed air at a pressure of about 90 psig. is delivered through a line 53, the valve 45, an orifice 54, a check valve 55 and into a Tee 56 from which it is injected into water flowing in the line 29 (FIG. 2) from the pump 40 to the control module 31. A pressure relief valve 57 (FIG. 3) in a line 58 opens in the event of an excessive pressure, say, greater than 95 psig., in the line 48. When the valve 57 is open, air flow from the line 48 through the valve 57 and the line 58, and into the treating tank 10 to relieve the excessive pressure.

Figure 4:
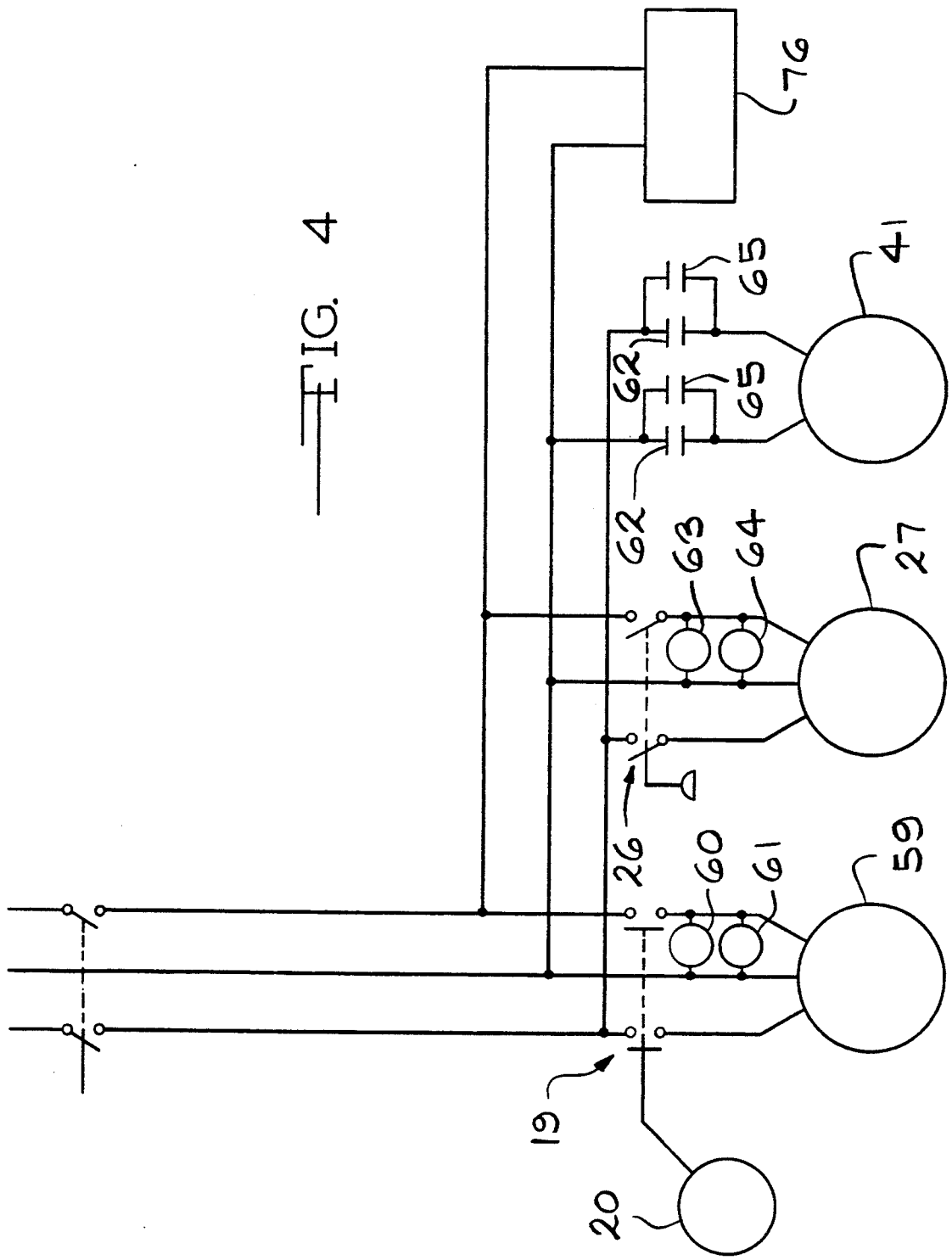
FIG. 4 is a wiring diagram showing the electric circuits of the apparatus of FIG.1.

The wiring of the apparatus of FIG. 1, is shown schematically in FIG. 4. As thus far described, when the float 20 closes the switch 19, a well pump 59, a relay 60 and a relay 61 are all energized. The well pump 59 delivers water to the treating tank 10, as previously described, while the relay 60 closes contacts 62 to energize the motor 41 to drive the compressor 40 and the relay 61 energizes the solenoid 42 (FIG. 3) to open the valve 44. When the pressure sensitive switch 26 is closed, the motor 27 and relays 63 and 64 (FIG. 3) are energized. The motor 27 drives the pump 28 (FIG. 2) to deliver water to the control module 31, as previously described, while the relay 63 (FIG. 4) closes contacts 65 to energize the motor 41 to drive the compressor 40 and the relay 64 energizes the solenoid 43 to open the valve 45 (FIG. 3).

Referring, again, to FIG. 2, the medium in the filter vessel 11 has a capacity of at least 610 grams per cubic foot for sulfide, a capacity of at least 312 grams per cubic foot for iron, and a capacity of at least 1,040 grams per cubic foot for manganese. Accordingly, after some period of use, the length of which depends upon the quantities of impurities removed, regeneration is required. Regeneration involves directing water and air from the control module 31 downwardly through the tube 35 so that it flows upwardly through the filter vessel 11 and the flint 34 and filter medium 33 therein, and back into another part of the control module 31, from which it is discharged through a back wash drain line 67, an auxiliary back wash drain line 68, or both, flowing into the line 24 to be discharged to a sewer or septic tank, as indicated by the arrow 25.

When the well pump 59 (FIG. 4) is energized, water from the well enters one leg of the Tee 52, as indicated by an arrow 69 (FIG. 5), and flows downwardly through the fogging nozzle 15. Compressed air, as indicated by an arrow 70, flows into a tube 71 that is threaded into the Tee 52, and flows downwardly through the tube 71 to an open end 72 thereof. Compressed air discharged from the open end 72 of the tube 71 forces itself into solution in the water that has flowed downwardly from the Tee 52, around the tube 71, and into the fogging nozzle 15, and forces the water to flow at a relatively high velocity from an open end of the fogging nozzle which projects into the tank 10. As a consequence, water containing a substantial amount of dissolved air is fogged inside the tank 10, forming droplets that preferably range in size up to about 100 "$\mu m$" (micro meters, or microns) and, most preferably, from about 70 to 80 $\mu m$. The dissolved air in the water fogged inside the tank 10 and in that which settles on the hollow propylene spheres 16 (FIG. 2) therein forces substantial proportions, i.e., up to 90%, of hydrogen sulfide out of the water and into the air in the tank 10; air, the hydrogen sulfide and some entrained water are ultimately discharged from the tank 10 through the line 21 from which the water flows downwardly into a drain as indicated by the arrow 25 while the air and hydrogen sulfide are discharged upwardly through the vent stack 22 (FIG. 3) as indicated by the arrow 23. Test have demonstrated that well water having 60 "ppm" (parts by weight per million) $H_2S$ will release 54 to 57 ppm $H_2S$ in the treating tank 10 when the fogging nozzle operates to form water droplets that range in size between about 70 to 80 $\mu m$. Thus, the system is preferably operated so that approximately 90% of sulfur compounds are removed from the water and vented from the treating tank before the water is further treated in the system.

Referring again to FIG. 2, when the motor 27 is energized and drives the pump 28, the motor 41, as has been described previously, is also energized to drive the air compressor 40 (FIG. 3) so that air from the line 53 enters one leg of the Tee 56 while water from the line 29 enters another leg thereof; accordingly, it is aerated water that flows from the Tee 56 into the control module 31 and through the line 32 into the filter tank 11. The air and water flow downwardly in the filter tank 11 where they come into contact with the "Pyrolox" filter medium 33 and with the flint 34 and then flow into the tube 35 and to the de-aerating tank 12, as previously described. As best seen in FIGS. 6 and 7, the tube 35 has slits 74 which start near its lower end 75 and extend upwardly, parallel to its axis, to a point 73 which is below the top of the flint layer 34 in the filter tank 11, as shown in FIG. 2.

The filter medium in the filter tank 11 forms a loose bond with $H_2S$, iron and manganese salts from the water which flows through the filter tank 11. For example, water containing 60 "ppm" (parts by weight per million) $H_2S$ has been treated for use in a single household in apparatus according to the invention where about 8 gallons of water in the treating tank 10 raised the float 20 to a position at which the switch 19 was closed, where the filter tank 11 and the de-aerating tank 12 both had capacities of about 8 gallons of water, where the well pump 59 had a capacity of about 8 gallons per minute, and the pump 28 had a capacity of about 6 gallons per minute. The water delivered from the de-aerating tank 12 was found to be odorless, and to remain odorless after nearly five days of use. With further usage, an odor of $H_2S$ was noted in the water delivered from the de-aerating tank 12. Thereupon, the control module 31 was set to a "backwash" position; the motor 27 was energized to operate the pump 28; and the motor 41 was energized to operate the air compressor 40, causing water and air in the line 29 to flow into the control module 31. In the "backwash" position, the module 31 discharged the water and the air from the line 29 into the tube 35, where it flowed downwardly and then through the slits 74 into the flint bed 34, and from thence upwardly through the filter medium 33. With the control module 31 in the backwash position, liquid that flowed upwardly through the filter tank 11, through the line 66 into the control module 31, was directed into the backwash drain line 67, into the auxiliary backwash drain line 68, or into both, so that the water used for backwashing was discharged into a drain as indicated by the arrow 25. Backwashing was continued for 15 minutes, after which time the control module was set in a "slow rinse" position and the motor 27 was energized to pump water to the control module 31. Water flowing through the module 31 in the "slow rinse" position was directed through an orifice (not illustrated) which is open to air and then through the line 32 into the filter tank 11, so that a relatively small amount of air was induced into the water stream and flowed with it into the tank 11. Slow rinsing was continued for about 40 minutes, after which time the module was set to the position first described, the motor 27 was set to drive the pump 28 to deliver water at a rate of about 6 gallons per minute, and operation was resumed as previously described. Again, water with no odor was delivered from the deaerating tank 12.

The apparatus also includes a filter timer 76 (FIG. 4) which, for the installation described above, has been set to initiate a "backwash" cycle as required. When actuated by the filter timer 76, the control module 31 causes the apparatus to carry out the "backwash" cycle described above and then to return to the treating cycle described above. The apparatus has been tested, and has been found to produce odor free water on this cycle.

For purposes of comparison, a treating tank-aerator was substituted for the treating tank 10 of the apparatus of the instant invention. The treating tank-aerator, which was essentially the combination of the vessel 10 with the standpipe 11 shown in FIG. 1 of U.S. Pat. No. 4,992,181, differing in that the line 35 and the venturi were eliminated, was operated so that the air pressure in the standpipe 11 was about 40 psig and approximately 200 $\mu m$ water droplets were sprayed therein; the cross line 12 was connected to the suction side of the pump 28 (FIG. 2 of the attached drawings). Water discharged from the line 39 had a pronounced "sulfur" odor when well water containing about 40 ppm $H_2S$ was introduced into the treating tank of the apparatus made for purposes of comparison.

It will be apparent that various changes and modifications are possible from the details of the instant invention as shown in the attached drawings and described herein with reference thereto without departing from the spirit and scope thereof as defined in the attached claims.

I claim:

1. Apparatus for treating potable water to remove odorous sulfur compounds therefrom, said apparatus comprising a treating tank, a fogging nozzle connected to an opper portion of said treating tank and having a water inlet and an outlet for fogged water, the outlet of said fogging nozzle being operable to discharge water into the interior of said treating tank, means for directing water to be treated into the water inlet of said fogging nozzle, means for injecting compressed air into the water directed into the water inlet of said fogging nozzle at a pressure sufficiently high that minus 100 micron water droplets leave the outlet of said fogging nozzle and are discharged into the interior of said treating tank, means for controlling said means for directing the water to be treated into the inlet of said fogging nozzle to maintain a body of water in the bottom of said treating tank, a filter vessel connected to said treating tank, a bed of a filter medium which forms a loose bond with $H_2S$ in said filter vessel, a de-aerating tank connected to said filter vessel, means for directing water from said treating tank through said filter bed and into said de-aerating tank, means for injecting air into water withdrawn from said treating tank before it flows through said filter bed, and means for venting gases from said de-aerating tank.

2. Apparatus for treating potable water to remove odorous sulfur compounds therefrom, said apparatus comprising a treating tank, a fogging nozzle connected to an upper portion of said treating tank and having a water inlet and an outlet for fogged water, the outlet of said fogging nozzle being operable to discharge water into the interior of said treating tank, means for directing water to be treated into the water inlet of said fogging nozzle, means for injecting compressed air into the water directed into the water inlet of said fogging nozzle at a pressure sufficiently high that 70 to 80 micron water droplets leave the outlet of said fogging nozzle and are discharged into the interior of said treating tank, means for controlling said means for directing the water to be treated into the inlet of said fogging nozzle to maintain a body of water in the bottom of said treating tank, a filter vessel connected to said treating tank, a bed of a filter medium which forms a loose bond with $H_2S$ in said filter vessel, a de-aerating tank connected to said filter vessel, means for directing water from said treating tank through said filter bed and into said de-aerating tank, means for injecting air into water withdrawn from said treating tank before it flows through said filter bed, and means for venting gases from said de-aerating tank.

* * * * *